United States Patent [19]
Berman et al.

[11] 3,808,880
[45] May 7, 1974

[54] APPARATUS FOR TESTING DIMENSIONAL VARIATIONS IN A TEST SPECIMEN

[75] Inventors: Irwin Berman, Upper Montclair; Robert Henschel, Lake Hiawatha; David H. Pai, Livingston; Charles F. Nash, Roseland; Anthony M. Mack; Bernardino M. Alfano, both of Somerville, all of N.J.

[73] Assignee: Foster Wheeler Corporation, Livingston, N.J.

[22] Filed: Aug. 3, 1972

[21] Appl. No.: 277,850

[52] U.S. Cl. .................................. 73/90, 73/15.6
[51] Int. Cl. ............................................ G01n 3/18
[58] Field of Search .................. 73/90, 15.6, 95, 93

[56] References Cited
UNITED STATES PATENTS

| 3,390,573 | 7/1968 | Ivanovic | 73/90 X |
| 2,448,133 | 8/1948 | Yorgiadis | 73/100 |
| 2,007,286 | 7/1935 | Schopper | 73/100 X |

Primary Examiner—Jerry W. Myracle
Attorney, Agent, or Firm—John E. Wilson, Esq.; Marvin A. Naigur, Esq.

[57] ABSTRACT

An apparatus for testing for dimensional variations in a test specimen wherein two equally and oppositely directed loads are applied to the test specimen by a fulcrum lever, with any unbalances in the loads as a result of dimensional variations of the specimen caused by the application of the loads being continuously corrected.

8 Claims, 4 Drawing Figures

FIG. 3.
FIG. 4.
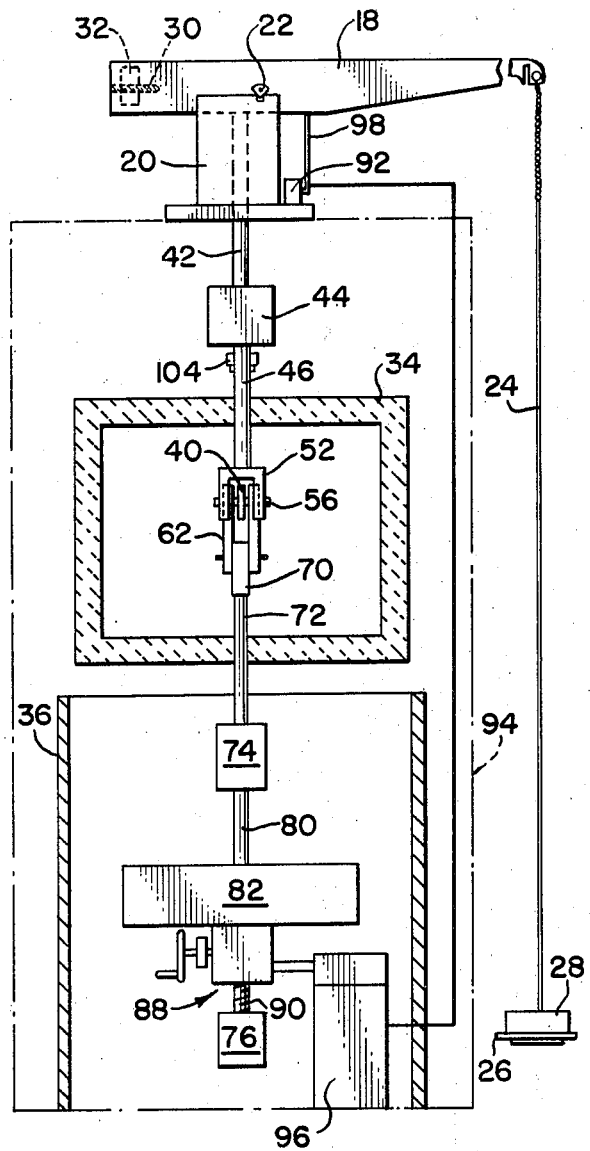
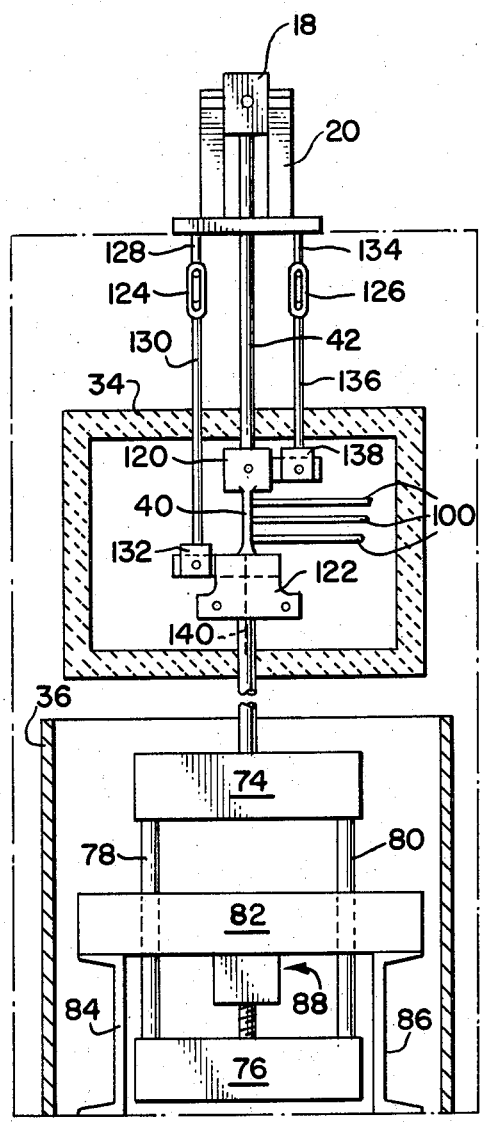

APPARATUS FOR TESTING DIMENSIONAL VARIATIONS IN A TEST SPECIMEN

BACKGROUND OF THE INVENTION

This invention relates to an apparatus for testing for dimensional variations in a test specimen and, more particularly, to such an apparatus utilizing weights acting through a lever to apply a load to the test specimen.

Several devices have been suggested for applying a load to a test specimen to measure the dimensional variations in the latter. However, a great majority of these devices do not compensate for the fact that dimensional variations in the specimen will cause a changing of the load. Although a manual compensation for this variation in load has been suggested, it requires monitoring by an operator and therefore is time consuming and expensive.

SUMMARY OF THE INVENTION

It is therefore an object of the present invention to provide an apparatus of the type described in which means are provided for continuously automatically correcting any unbalances in the loads applied to the test specimen as a result of dimensional variations of the specimen caused by the applications of the loads.

Toward the fulfillment of this and other objects, the apparatus of the present invention comprises means for applying a first load to said specimen, means for applying an additional load to said specimen of an equal value and in an opposite direction to said first load, and means for automatically continuously correcting any unbalances in said loads as a result of dimensional variations of said specimen caused by the application of said loads.

BRIEF DESCRIPTION OF THE DRAWINGS

FIG. 3 is a schematic view taken along the line 3—3 of FIG. 1; and

FIG. 4 is a view similar to FIG. 2 but depicting an alternate embodiment of the apparatus of the present invention.

DESCRIPTION OF THE PREFERRED EMBODIMENTS

Figure 1:
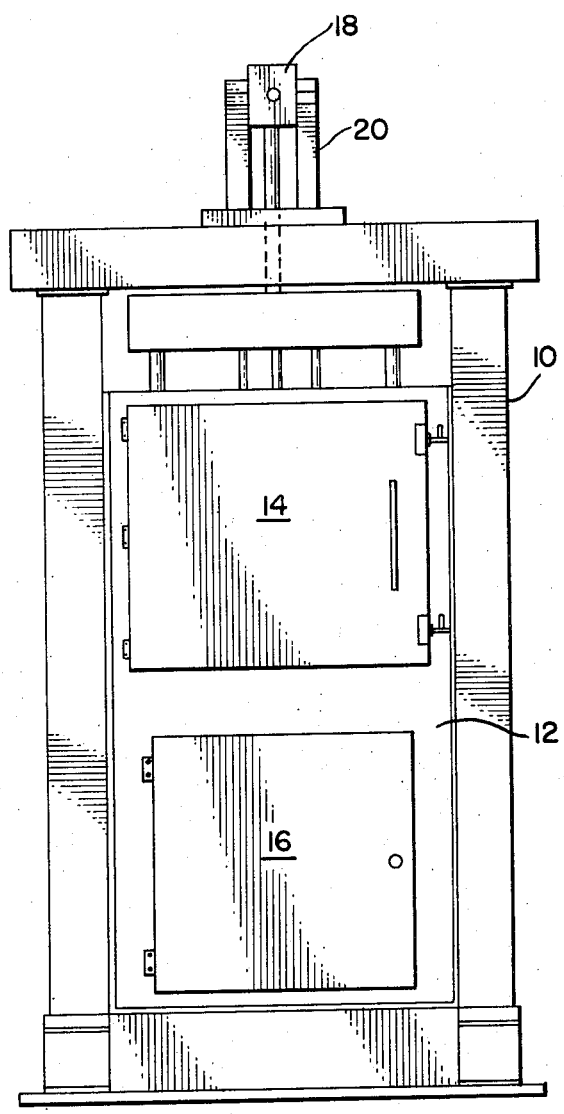
FIG. 1 is a front elevational view of the apparatus of the present invention.

Referring to FIG. 1 of the drawings, the reference numeral 10 refers to an outer housing which houses the components comprising the apparatus of the present invention. Supported within the outer housing 10 is an inner housing 12, a portion of which houses an oven which is closed by a door 14, and the lower portion of which houses a machine cabinet which is closed by a door 16.

A fulcrumed operating lever 18 is mounted on a bracket assembly 20 disposed on the top of the outer housing 12, with its function being described in detail later.

Figure 2:
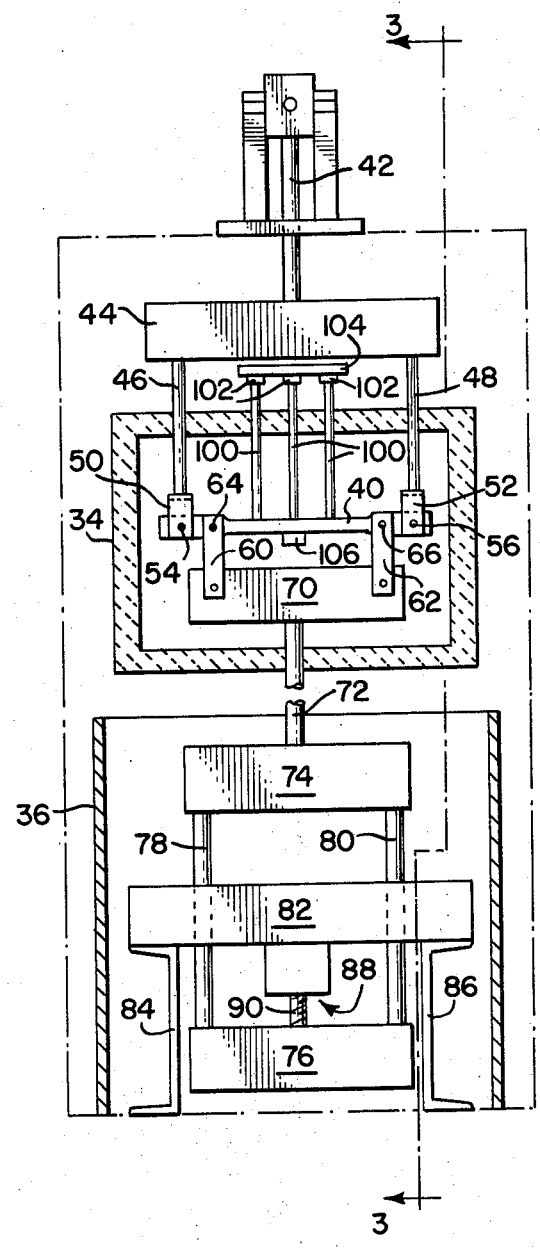
FIG. 2 is a schematic view of the apparatus of the present invention.

The working components of the apparatus of the present invention are shown in FIGS. 2 and 3. In particular, the lever 18 is fulcrumed about a fulcrum point 22 which is defined by the bracket assembly 20. The rear end of the lever 18 is connected by a chain 24 to a platform 26 which is adapted to receive a weight 28 to urge the front end of the lever 18 in a generally upwardly direction.

As viewed in FIG. 3, a set screw 30 is rotatably mounted in an opening formed through the front end portion of the lever 18 and supports a counterweight 32 disposed in a hollow portion of the lever in a manner so that rotation of the set screw will cause a movement of the counterweight in the direction from left to right, or vice versa, as viewed in FIG. 3, for reasons that will be described in detail later.

As shown in FIG. 2, the upper portion of the inner housing 12 consists of an oven shown in general by the reference numeral 34. The oven 34 may be constructed and insulated in a manner to produce a relatively high temperature to which the test specimen is subjected, which temperature may be maintained uniform by means of a blower (not shown) which circulates heated air through the oven. The lower portion of the inner housing 12 is in the form of a cabinet shown in general by the reference numeral 36.

A test specimen 40 is supported in the oven 34 in a generally horizontal direction by means of a loading mechanism and a retaining mechanism. The loading mechanism comprises a vertical cylindrical rod 42 connected at one end to the lever arm 18 immediately to the left of the fulcrum point 22 as shown in FIG. 3. The other end of the rod 42 is connected to a crossbar 44 which, in turn, is connected to the end portions of the test specimen 40 by means of a pair of vertical rods 46 and 48 and yokes 50 and 52. The actual physical connection of the test specimen 40 to the yokes 50 and 52 is made via a pair of horizontally extending pins 54 and 56 extending through aligned openings in the test specimen and yokes.

It is thus apparent that the weight 28 applied to the platform 26 causes the left hand, or front end, portion of the lever 18 to move in a generally upwardly direction thereby exerting a pulling force on the test specimen 40 via the rod 42, the crossbar 44, the rods 46 and 48, and the yokes 50 and 52.

The mechanism for restraining the test specimen includes a pair of yokes 60 and 62 attached to the end portions of the test specimen 40 immediately inwardly of the yokes 50 and 52 via a pair of horizontal pins 64 and 66. The yokes 60 and 62 are affixed to a horizontal rectangular load carrying member 70 which, in turn, is connected to a rod 72 extending outwardly from the oven 34, through and into the machine cabinet 36. An additional pair of horizontal load carrying members 74 and 76 are provided, with the member 74 being connected to the rod 72 and the member 76 being connected to the member 74 via a pair of parallel connecting rods 78 and 80.

A platform 82 is supported from the floor of the cabinet 36 by means of support members 84 and 86 and a screw jack 88 is supported on the lower surface of the platform 82. The screw jack 88 includes a threaded movable shaft member 90 which exerts a downwardly acting force upon the load carrying member 76. As a result, a downwardly directed force is exerted on the test specimen 40 via the load carrying members 74 and 76, the rods 72, 78 and 80, the load carrying member 70 and the yokes 60 and 62.

It can be appreciated that, as a result of the loads produced through the loading mechanism including the lever 18 and the weight 28, and the restraining mechanism including the screw jack 88, a pair of equally and opposite in-plane bending moments are applied to the end portion of the test specimen 40.

An assembly is provided for maintaining the lever 18 perfectly horizontal despite dimensional variations in the test specimen 40 resulting from the above-mentioned applied loads. This assembly consists of a device responsive to tilting movements of the lever 18, and is shown in general by the reference numeral 92 in FIG. 3. The assembly 92 is electrically connected via the conductor 94 to a motor and gear unit shown in general by the reference numeral 96 to operate same in a manner to be described.

The tilting responsive device 92 can take any conventional form such as that manufactured by the Brown Instrumentation Division of the Minneapolis Honeywell Regulator Company, Philadelphia, Pennsylvania, and marketed under the trademark "ELECTR-O-VANE". Since the device 92, per se, forms no part of the present invention it is not shown in detail in the drawings and will be described only generally as follows.

In general, the device 92 consists of a vane, a pair of oscillator coils, an electronic circuit, and a power relay. The coils are physically aligned and connected to be regenerative. The actuating arm of the vane is connected to the lever 18 via a connecting rod 98 to regulate the vane. As the vane sweeps between the coils, their series inductance drops until, at a sharp, critical point, oscillation stops. The grid loses its negative bias, causing a sudden gain in plate current, which powers the relay. The relay then actuates a reversing contactor switch via the conductor 94, which operates the motor portion of the motor and gear unit 96. The gear portion of the motor and gear unit 96 includes a reduction gear which, after actuating several additional gears and shafts, turns vertical screw jack 90 in a manner to exert a downwardly directed force on the load carrying member 76, and therefore the entire restraining mechanism described above. As a result, the test specimen 40 is lowered until the lever 18 is leveled. The vane is then withdrawn from between the coils, causing the oscillation to resume, thereby cutting off power to the relay.

As the specimen continues to creep, causing the lever 18 to resume rotating, the entire leveling process begins again resulting in an automatic continuous correction of unbalances in the loads caused by dimensional variations in the test specimen as a result of the loads. This assembly is sufficiently accurate to keep the rotations of the lever 18 to within one degree.

The deflections of the test specimen 40 as a result of the above-mentioned in-plane bending moments are monitored by three elongated, preferably crystal, rods each being shown by the reference numeral 100 in FIG. 2. One end of each of the rods 100 engages the upper surface of the specimen 40 inside the oven 34, while the other ends of the rods engage three gauges 102, respectively, supported on a support platform 104 extending immediately above the oven 34. The gauges 102 may be of any conventional variety such as the linear variable differential transformer type, and are responsive to dimensional variations in the test specimen 40 transferred through the rods 100. A thermocouple 106 may be placed at approximately the middle of the test specimen 40 to measure its temperature.

It is understood that the outputs of the gauges 102 as well as the thermocouple 106, may all be fed into a continual null balance type d-c potentiometer (not shown) which includes a readout device which indicates and records the condition of the dimensional variations in the specimen as well as the temperature.

It is understood that safety stops can be applied to the lever 18 to limit its pivotal movement, as well as to the load carrying members 74 and 76 in order to limit their movement to the extent they may engage or cause damage to themselves or other components.

In operation, the test specimen is placed in the yokes 50 and 52 attached to the loading mechanism and the lever 18 is then balanced in a perfectly horizontal position by rotating the set screw 30 to cause the counterweight 32 to move axially along the lever until the balance is achieved.

The yokes 60 and 62 are then attached to the test specimen 40 and the weight 28 of a finite value is placed on the loading platform 26. In the latter operation a scissors jack or the like, can be utilized to initially support the weight 28. The quartz rods are then placed on the upper surfaces of the test specimen and the electrical components are zeroed in and calibrated. The above-mentioned scissors jack can then be lowered and moved away from the weight 28 to apply the mechanical load to the test specimen 40 in the manner described above. It can be appreciated that the above mentioned initial balancing of the lever 18 cancels any loads provided by the loading mechanism itself and therefore insures that the value of the weight 28 applied to the loading platform 26 will be directly proportional to the load applied to the test specimen 40.

Since the distance from the fulcrum point 22 to the rear end of the lever 18 is much greater than the distance from the fulcrum point to the point of connection of the rod 42 to the lever 18, a weight 28 of a relatively low value will apply a relatively high load to the test specimen 40. For example, the arrangement may be such that the ratio between the actual load applied to the test specimen 40 and the value of the weight 28 can be in the order of 30 to 1.

The embodiment of FIG. 4 is similar to that of FIG. 1 with identical structure being given the same reference numerals. However, the embodiment of FIG. 4 is modified so that axial loads as well as cyclic bending loads can be applied to the test specimen. In the embodiment of FIG. 4, the test specimen 40 is placed in a vertical position and is secured to a pair of collars 120 and 122. The rod 42, which is connected to the lever 18, exerts an upwardly extending axial load on the test specimen 40 via the collar 120. The test specimen 40 is restrained at its other end by the collar 122 through the restraining mechanism discussed in connection with the previous embodiment.

A pair of turnbuckles 124 and 126 are utilized to apply cyclic bending moments to the test specimen 40. In particular, the turnbuckle 124 is connected between a pair of threaded rods 128 and 130 with the rod 128 being supported by the base of the bracket assembly 20, and with rod 130 being connected to the collar 122 via a yoke 132 extending to the side of the test specimen 40. In a similar manner, the turnbuckle 126 is connected between a pair of threaded rods 134 and 136 with the rod 134 being supported by the base of the bracket 20, and with the rod 130 being connected to the collar 120 via a yoke 138 extending to the other side of the test specimen 40.

The cyclic bending moments are achieved by turning both turnbuckles 124 and 126 in the same circular direction simultaneously, for example, clockwise, as viewed in FIG. 4. This causes the vertical rods 128, 130, 134 and 136 to go into tension which in turn loads the test specimen 40. To reverse the direction of the moments it is only necessary to turn the turnbuckles in the opposite direction. The axial load, of course, is achieved in the same manner as the in-plane bending moments were applied in the previous embodiment by application of the weight 28 to the platform 26 which is transformed through the remainder of loading mechanism including the lever 18 to the test specimen 40 in an identical manner.

As a result of both the cyclic bending moments effected by the turnbuckles 124 and 126 and the axial load achieved by the weight 28 acting through the lever 18, the test specimen 40 is subjected to a symmetrical loading condition which consists of a pair of opposite directed equal bending moments and an axial load caused by the weight 28 as well as the relatively small tensile load developed by the turnbuckles 124 and 126.

It is noted that the measuring rods 100 extend in a horizontal direction to measure the bending moments while a rod 140 (represented by the dotted line in FIG. 4 in the interest of clarity) is provided to measure the axial elongation of the specimen. Also, in the interests of clarity, the gauges associated with the rods 100 and 140 are not depicted in FIG. 4, it being understood that they are identical to those described in connection with the previous embodiment.

It is understood that the leveling assembly, as well as the apparatus for measuring the loads and temperatures and recording the data is identical to that of the previous embodiment.

Of course, other variations of the specific construction and arrangement of the apparatus disclosed above can be made by those skilled in the art without departing from the invention as defined in the appended claims.

We claim:

1. An apparatus for testing for dimensional variations in a test specimen, said apparatus comprising a fulcrummed lever, a weight connected to said lever to one side of its fulcrum point, and means connecting said specimen to said lever at the other side of said pivot point in a manner so that said weight applies a first force to said specimen, a load carrying member connected to said specimen, means for applying a second force against said load carrying member in the opposite direction to said first force to restrain said specimen against movement in the direction of said first force and apply a load to said specimen, and means for continuously varying said second force in response to dimensional variations of said specimen caused by said load to maintain said load constant.

2. The apparatus of claim 1 wherein said second force applying means comprises a platform disposed adjacent said load carrying member and a screw jack supported by said platform and engaging said load carrying member to apply a force thereto.

3. The apparatus of claim 2 wherein said force varying means comprises means responsive to movement of said lever as a result of said dimensional variations of said specimen for varying the force applied to said load carrying member by said screw jack.

4. The apparatus of claim 1 wherein said specimen is an elongated bar supported in a generally horizontal position, and wherein said connecting means transmits said first force at two locations near the ends of said bar in an upward direction, and further comprising means for transmitting said second force to two spaced locations of said bar in a downward direction to create equal and opposite in-plane bending moments at two portions of said bar.

5. The apparatus of claim 1 further comprising means for transmitting said first and second forces to said specimen in a manner to apply cyclic bending moments to said specimen.

6. The apparatus of claim 1 further comprising means for varying the effective weight of said lever at said other side of said fulcrum point for cancelling any upwardly directed vertical forces on said specimen other than that provided by said weight.

7. The apparatus of claim 1 further comprising an oven for receiving said specimen and subjecting said specimen to a predetermined elevated temperature, a portion of said connecting means and a portion of said means for applying said second force extending externally of said oven.

8. The apparatus of claim 7 comprising at least one rod engaging said specimen, and gauge means positioned externally of said oven and cooperating with said rod to indicate dimensional variations in said specimen.

* * * * *